United States Patent
Teboulle et al.

(10) Patent No.: US 11,477,692 B2
(45) Date of Patent: Oct. 18, 2022

(54) METHOD FOR COMMUNICATION BETWEEN FIRST AND SECOND NODES IN A NETWORK

(71) Applicant: SAGEMCOM ENERGY & TELECOM SAS, Rueil Malmaison (FR)

(72) Inventors: Henri Teboulle, Rueil Malmaison (FR); Marc Le Gourrierec, Rueil Malmaison (FR)

(73) Assignee: SAGEMCOM ENERGY & TELECOM SAS, Rueil Malmaison (FR)

( * ) Notice: Subject to any disclaimer, the term of this patent is extended or adjusted under 35 U.S.C. 154(b) by 0 days.

(21) Appl. No.: 16/590,825

(22) Filed: Oct. 2, 2019

(65) Prior Publication Data

US 2020/0112880 A1  Apr. 9, 2020

(30) Foreign Application Priority Data

Oct. 9, 2018  (FR) .................................... 18/59364

(51) Int. Cl.
| | |
|---|---|
| *H04L 12/801* | (2013.01) |
| *H04W 28/06* | (2009.01) |
| *H04L 47/34* | (2022.01) |
| *H04W 84/04* | (2009.01) |

(52) U.S. Cl.
CPC ........... *H04W 28/065* (2013.01); *H04L 47/34* (2013.01); *H04W 84/04* (2013.01)

(58) Field of Classification Search
CPC ..... H04L 1/1621; H04L 47/34; H04L 5/0055; H04L 9/304; H04L 2209/34; H04W 28/06; H04W 28/065; H04W 4/80; H04W 80/08; H04W 84/04; H04W 84/12
See application file for complete search history.

(56) References Cited

PUBLICATIONS

Minaburo et al. ("LPWAN Static Context Header Compression (SCHC) and fragmentation for IPv6 and UDP"; Ipwan Working Group; No. 15; pp. 1-69; Jun. 29, 2018 (Year: 2018).*
Augustin et al. ("A Study of LoRa; Long Range & Low Power Networks for the Internet of Things"; SENSORS; vol. 16; No. 9; pp. 1-18; Sep. 9, 2016 (Year: 2016).*

(Continued)

*Primary Examiner* — Melvin C Marcelo
*Assistant Examiner* — Natali Pascual Peguero
(74) *Attorney, Agent, or Firm* — Oliff PLC

(57) ABSTRACT

Some protocols for the transmission of data on a communication network, such as the LoRaWAN protocol, use frames comprising payloads intended to transport useful data, the size of which may vary from one frame to another. A communication method is proposed in order to transmit data on this type of network. This method is based on a division of a payload packet into a set of blocks and then an insertion of the blocks thus formed into at least one segment. Each segment comprises a number of blocks suited to a payload size at the time of creation of the segment. The segments are next supplemented with verification information enabling an addressee of the data packet to determine whether it has received all the blocks. In the event of non-reception of all the blocks, the sender of the blocks retransmits at least the blocks not received.

9 Claims, 4 Drawing Sheets

(56) References Cited

PUBLICATIONS

May 27, 2019 Search Report issued in French Patent Application No. 18/59364.

Minaburo et al.; "LPWAN Static Context Header Compression (SCHC) and fragmentation for IPv6 and UDP;" Ipwan Working Group; No. 15; pp. 1-69; Jun. 29, 2018.

Augustin et al; "A Study of LoRa: Long Range & Low Power Networks for the Internet of Things;" SENSORS; vol. 16; No. 9; pp. 1-18; Sep. 9, 2016.

* cited by examiner

METHOD FOR COMMUNICATION BETWEEN FIRST AND SECOND NODES IN A NETWORK

The invention relates to a communication method, executed in a long-range wireless network and affording low energy consumption, and a device and system implementing the method.

The internet is gradually being transformed into an extended network, referred to as the "Internet of Things", connecting all kinds of objects that have become connectable. New requirements in terms of networks have then arisen, and in particular requirements for wireless networks having greater coverage than conventional cellular networks and making it possible to limit energy consumption of the connected equipment. Among these long-range wireless networks affording low energy consumption (low power wide area network (LPWAN)), mention can be made of networks based on the LoRa (registered trade mark) (long range) technology. LoRa technology operates on frequency bands known by the term "ISM band" (industrial, scientific and medical) comprising frequency bands that can be used freely for industrial, scientific and medical applications. LoRa technology is based on a spread spectrum technology making it possible to obtain low-bitrate communications having good robustness in a particularly noisy ISM band.

A network based on LoRa technology (referred to as "LoRa network" hereinafter) uses a protocol called LoRaWAN. A LoRa network is composed of base stations or gateways generally placed on high points in order to cover a large geographical area. The gateways are able to detect messages sent in their area by equipment or terminals ("endpoints") and to transfer them to at least one server (LoRa network server (LNS)), which will process them.

In a conventional functioning of a LoRa network, an endpoint wishing to transmit a message (i.e. data) to the LNS server transmits this message in a frame, referred to as an uplink frame, in accordance with the LoRaWAN protocol. The uplink frame is transmitted in broadcast mode. This uplink frame is received by at least one gateway. Each gateway that has received the frame decodes it and retransmits the message to the LNS server, for example in an HTTP (hypertext transfer protocol) request or an HTTPS (hypertext transfer protocol secure) request. If a plurality of gateways have received the uplink frame, the LNS server receives a plurality of HTTP (or HTTPS) requests containing the message. The LNS server must then designate, among the gateways that received the uplink frame, the gateway to be used for relaying a response to the message contained in the uplink frame. The response is transmitted from the LNS server to the designated gateway in an HTTP (or HTTPS) request, then in unicast mode, from the designated gateway to the endpoint in a downlink frame in accordance with the LoRaWAN protocol. In a majority of implementations of LoRa networks, the designated gateway is the one offering the best transmission quality with the terminal that sent the uplink frame. A frame in accordance with the LoRaWAN protocol will hereinafter be referred to as a LoRa frame.

LoRa networks were developed initially for transporting data coming from connected objects. It was however quickly realised that other types of data, which are generally transported by other types of network such as IP (internet protocol) networks version 4 (RFC-791) or version 6 (RFC-2460) or PL (power line) networks, can be transported or relayed by LoRa networks. These data are then transported in containers (payloads), referred to as LoRa payloads, at the application level in the OSI (open systems interconnection) model, these LoRa payloads corresponding to a useful part (payload) of the LoRa frames. One particularity of LoRa payloads is that they may have sizes that may vary from one LoRa frame to another LoRa frame. These variations in size of LoRa payloads are caused by variations in an available bitrate for the application data, referred to as the useful bitrate. During a data transmission, the useful bitrate may vary under the influence of the LNS server, which for example modifies a modulation used for the transmission, or because control data, which have priority in the LoRaWAN protocol, must be transmitted.

When application-level frames, referred to as application frames, have a greater size than the size of the LoRa payload that is to transport them, these application frames must be segmented into a plurality of segments suited to the size of said payload. Many frame segmentation mechanisms in the literature rely on segmentations into segments of fixed size. A segmentation into segments of fixed size combined with transportation in payloads of variable sizes more or less makes it necessary to align the size of the segments on a minimum size of the payloads. Using such segmentation in a context of transportation by payloads of variable sizes is ineffective since it gives rise to a proportion of signalling data (or header data) that is too great compared with the useful data. There also exist so-called byte-aligned segmentations using segments of variable sizes suited to payloads of variable sizes. This type of segmentation uses signalling making it possible to point to bytes in the payloads, which there again gives rise to a proportion of signalling data that is large compared with the useful data.

It is desirable to overcome these drawbacks of the prior art. It is in particular desirable to propose a method for effectively encapsulating application frames in LoRa payloads, the application frames having sizes greater than the sizes of the LoRa payloads to transport them. Moreover, it is desirable for the method proposed to allow effective management of any transmission errors causing losses of frames.

It is moreover desirable to propose a method that is simple to implement at low cost.

According to a first aspect of the present invention, the present invention relates to a method for communication between first and second nodes in a network using a frame transmission protocol, each frame in accordance with said protocol, referred to as a protocol frame, comprising a payload intended to transport useful data, each payload having a size that may vary from one protocol frame to another protocol frame. The method comprises, when it is executed by the first node: obtaining a payload frame to be transmitted to the second node; dividing the payload frame into a set of blocks of predefined size, each block being associated with a number equal to a rank of said block in the payload frame; applying an encapsulation and transmission procedure to the blocks of said set comprising: running through the blocks in decreasing order of their number, and inserting the blocks in this order in at least one segment, the blocks being inserted in each segment until a segment size that is as close as possible to a current size of a payload is reached while remaining smaller than or equal to it; inserting in each segment verification information comprising an identifier representing the number of the block that has the highest rank in said segment, and in addition comprising an error identification code making it possible to determine whether the set of blocks has been received in the segment containing the block with the lowest rank; and transmitting each segment to the second node in a protocol frame; and, in the case of reception of an acknowledgement of reception from the second node containing information representing at least one block not received by the second node, applying the encapsulation and transmission procedure to at least each block that was not received, the second node having used each item of verification information received in order to determine each block lost.

In one embodiment, the network is a long-range wireless network affording low energy consumption based on LoRa technology, the protocol is the LoRaWAN protocol and the first node is a device suitable for communicating on a LoRa network using the LoRaWAN protocol, referred to as a LoRa endpoint, and the second node is a LoRa network server, or the first node is a LoRa network server and the second node is a LoRa endpoint.

In one embodiment, if, following the transmission of each segment to the second node, the first node does not receive an acknowledgement of reception from the second node after a predefined time following the transmission of the last segment, the first node transmits to the second node a segment containing at least the block with the lowest rank, the error identification code and an identifier representing the number of the block that has the highest rank in said segment.

In one embodiment, the verification information is included in a header of said segment, said header further comprising information representing a change of set of blocks a value of which is modified each time a new set of blocks is transmitted to the second node and/or information representing a request for acknowledgement of reception, making it possible to activate or not a reception acknowledgement mechanism, the first node awaiting an acknowledgement of reception for the set of blocks from the second node when said mechanism is activated.

In one embodiment, the information representing at least one block not received by the second node is a series of bits, each bit in the series representing a block in the set of blocks, and, for each bit, a first value of said bit indicates a reception of the corresponding block and a second value of said bit indicates non-reception of the corresponding block.

In one embodiment, the acknowledgement of reception comprises information for identifying to which set of blocks said acknowledgement of reception relates and/or information indicating if, when there is a verification of integrity of the blocks received using the error detection code, the second node has or has not detected an error.

In one embodiment, when the first node is a server and the second node is a LoRa endpoint functioning in class A according to the LoRaWAN protocol, when the second node has received a first segment comprising blocks in a set of blocks, at each reception of a segment the second node measures a time since the reception of said segment and, when said time is greater than a predefined maximum time without a frame having been transmitted to the first node, transmits a protocol frame representing a request for transmission of data to the first node in order to enable the first node of transmit a new segment.

According to a second aspect of the invention, the invention relates to a device, referred to as the first node, of the communication node type suitable for communicating with a second device of the communication node type, referred to as the second node, in a network using a frame transmission protocol, each frame in accordance with said protocol, referred to as a protocol frame, comprising a payload intended to transport useful data, each payload having a size that may vary from one protocol frame to another protocol frame. The device comprises: obtaining means for obtaining a payload frame to be transmitted to the second node; segmentation means for dividing the payload frame into a set of blocks of predefined size, each block being associated with a number equal to a rank of said block in the payload frame; processing means for applying an encapsulation and transmission procedure to the blocks in said set comprising: running-through means for running through the blocks in decreasing order of their number, and inserting the blocks in this order in at least one segment, the blocks being inserted in each segment until a segment size as close as possible to a current size of a payload is reached while remaining smaller or equal; encapsulation means for inserting in each segment verification information comprising an identifier representing the number of the block that has the highest rank in said segment and also comprising an error identification code for determining whether the set of blocks has been received in the segment containing the block with the lowest rank; transmission means for transmitting each segment to the second node in a protocol frame; and reception means for receiving from the second node an acknowledgement of reception comprising information representing at least one block not received by the second node, processing means for applying an encapsulation and transmission procedure to at least each block not received in the case of reception of such an acknowledgement of reception from said second node, the second node having used each item of verification information received in order to determine each block lost.

According to a third aspect of the invention, the invention relates to a computer program comprising instructions for the implementation, by a device, of the method according to the first aspect, when said program is executed by a processor of said device.

According to a fourth aspect, the invention relates to storage means storing a computer program comprising instructions for the implementation, by a device, of the method according to the first aspect when said program is executed by a processor of said device.

The features of the invention mentioned above, as well as others, will emerge more clearly from a reading of the following description of an example embodiment, said description being given in relation to the accompanying drawings, among which:

The invention is described hereinafter in a context of a LoRa network. The invention does however apply in other contexts for all types of network using a frame (or packet) transmission protocol in which each frame intended to transport a payload encapsulates this payload in a payload having a size that may vary from one frame to another frame.

Moreover, it is known that the LoRaWAN protocol defines three classes of endpoint, referred to as LoRa endpoints (A, B and C), each class of endpoint being associated with a particular operating mode. Class A must be implemented in all the endpoints for reasons of compatibility. A terminal may change class in the course of operation.

Class A is the most economical in terms of energy consumption for the endpoints. In this class, when a LoRa terminal has data to send it does so without any check since it opens two successive listening windows for any messages coming from the LNS server. These two windows are the only moments during which the LNS server can send to the endpoint the data that it has previously stored for its attention.

Class B offers a compromise between energy consumption for the LoRa endpoint and a need for bidirectional communication between said endpoint and the LNS server. Class B equipment opens a reception window at intervals programmed by periodic messages sent by the LNS server.

Class C is the least economical class in terms of energy consumption for the LoRa endpoints. On the other hand, this class allows bidirectional communications at all times since the LoRa endpoints are permanently listening out for the LNS server.

As we shall see hereinafter, the invention is particularly well suited to functioning in classes C and B. However, we shall also show an operating mode that is particularly suited to class A.

Figure 1:
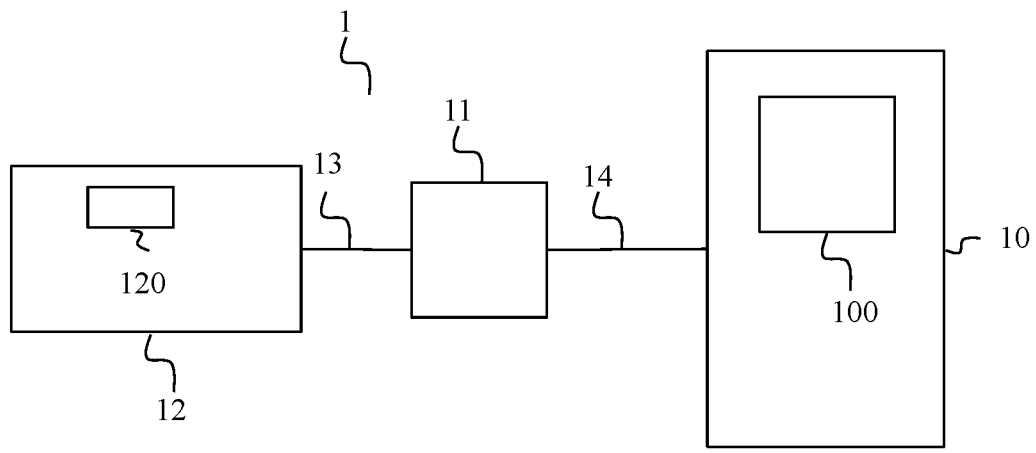
FIG. 1 illustrates schematically a LoRa network in which the invention is implemented.

FIG. 1 illustrates schematically an example of a LoRa network 1 in which the invention is implemented.

In the example in FIG. 1, the LoRa network 1 comprises an LNS server 10, at least one gateway 11 and at least one LoRa endpoint 12. In FIG. 1, to simplify, we describe only one gateway and one LoRa endpoint. The gateway 11 communicates with the LNS server 10 by means of a cable or wireless communication link.

Moreover, each communication between the gateway 11 and the LoRa endpoint 12 uses a wireless communication link 13.

The LNS server 10 comprises a processing module 100. The LoRa endpoint 12 comprises a processing module 120.

It should be noted that, in the LoRa network 1, the communications between the endpoint 12 and gateway 11 use frames compatible with the LoRaWAN protocol. The LoRaWAN document 1.1 of October 2017 defines communications between the endpoints and the gateways of a LoRa network. Moreover, the communications between the gateway 11 and the LNS server 10 take place, for example, in the form of HTTP or HTTPS requests. In the invention, the gateway 11 fulfils a role of relay between the LoRa endpoint 12 and the LNS server 10. In a so-called uplink direction, that is to say for transmissions from the LoRa endpoint 12 to the LNS server 10, the gateway 11 encapsulates the LoRa frames that it receives in HTTP or HTTPS frames, and transmits the LoRa frames thus encapsulated to the LNS server 10. In a so-called downlink direction, that is to say for transmissions from the LNS server 10 to the LoRa endpoint 12, the gateway 11 extracts the LoRa frames that it receives in HTTP or HTTPS frames, and transmits the LoRa frames obtained to the terminal 12.

We describe here an LNS server 10. In one embodiment, this LNS server 10 could just as well represent a set of servers comprising a first server intended to communicate with gateways such as the gateway 11 and at least one application server connected by a communication network to the first server. In this embodiment, the first server would serve as a relay between the gateways and the application server or servers, the LoRa frames generated by the LoRa endpoint 12 being intended for the application server or one of the application servers.

Figure 2A:
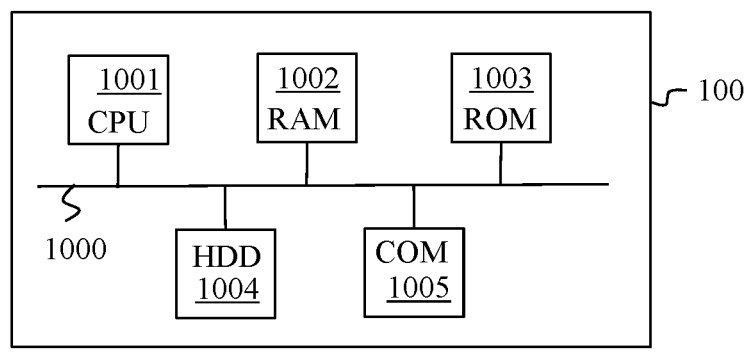
FIG. 2A illustrates schematically a processing module included in an LNS server.

FIG. 2A illustrates schematically an example of hardware architecture of the processing module 100 included in the LNS server 10.

According to the example of hardware architecture depicted in FIG. 2A, the processing module 100 then comprises, connected by a communication bus 1000: a processor or CPU (central processing unit) 1001; a random access memory RAM 1002; a read only memory ROM 1003; a storage unit such as a hard disk or a storage medium reader such as an SD (Secure Digital) card reader 1004; at least one communication interface 1005 enabling the processing module 100 to communicate with other modules or devices. For example, the communication interface 1005 enables the processing module 100 to communicate with the gateway 11 of the LoRa network 1 or with remote servers belonging to the cloud, such as the application servers mentioned above.

The processor 1001 is capable of executing instructions loaded in the RAM 1002 from the ROM 1003, from an external memory (not shown), from a storage medium (such as an SD card), or from a communication network. When the LNS server 10 is powered up, the processor 1001 is capable of reading instructions from the RAM 1002 and executing them. In one embodiment, these instructions form a computer program causing the complete or partial implementation, by the processor 1001, of the methods described below in relation to FIGS. 3 and 8.

Figure 2B:
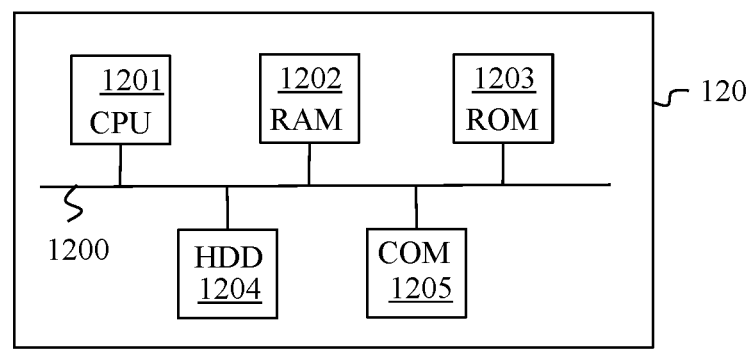
FIG. 2B illustrates schematically a processing module included in a LoRa terminal.

FIG. 2B illustrates schematically an example of hardware architecture of the processing module 120 included in the LoRa endpoint 12.

According to the example of hardware architecture depicted in FIG. 2B, the processing module 120 then comprises, connected by a communication bus 1200: a processor or CPU 1201; a random access memory RAM 1202; a read only memory ROM 1203; a storage unit such as a hard disk or a storage medium reader such as an SD card reader 1204; at least one communication interface 1205 enabling the processing module 120 to communicate with other modules or devices. For example, the communication interface 1205 enables the processing module 120 to communicate with the gateway 11.

The processor 1201 is capable of executing instructions loaded in the RAM 1202 from the ROM 1203, from an external memory (not shown), from a storage medium (such as an SD card), or from a communication network. When the endpoint 12 is powered up, the processor 1201 is capable of reading instructions from the RAM 1202 and executing them. In one embodiment, these instructions form a computer program causing the complete or partial implementation, by the processor 1201, of the methods described below in relation to FIGS. 3 and 8.

Figure 3:
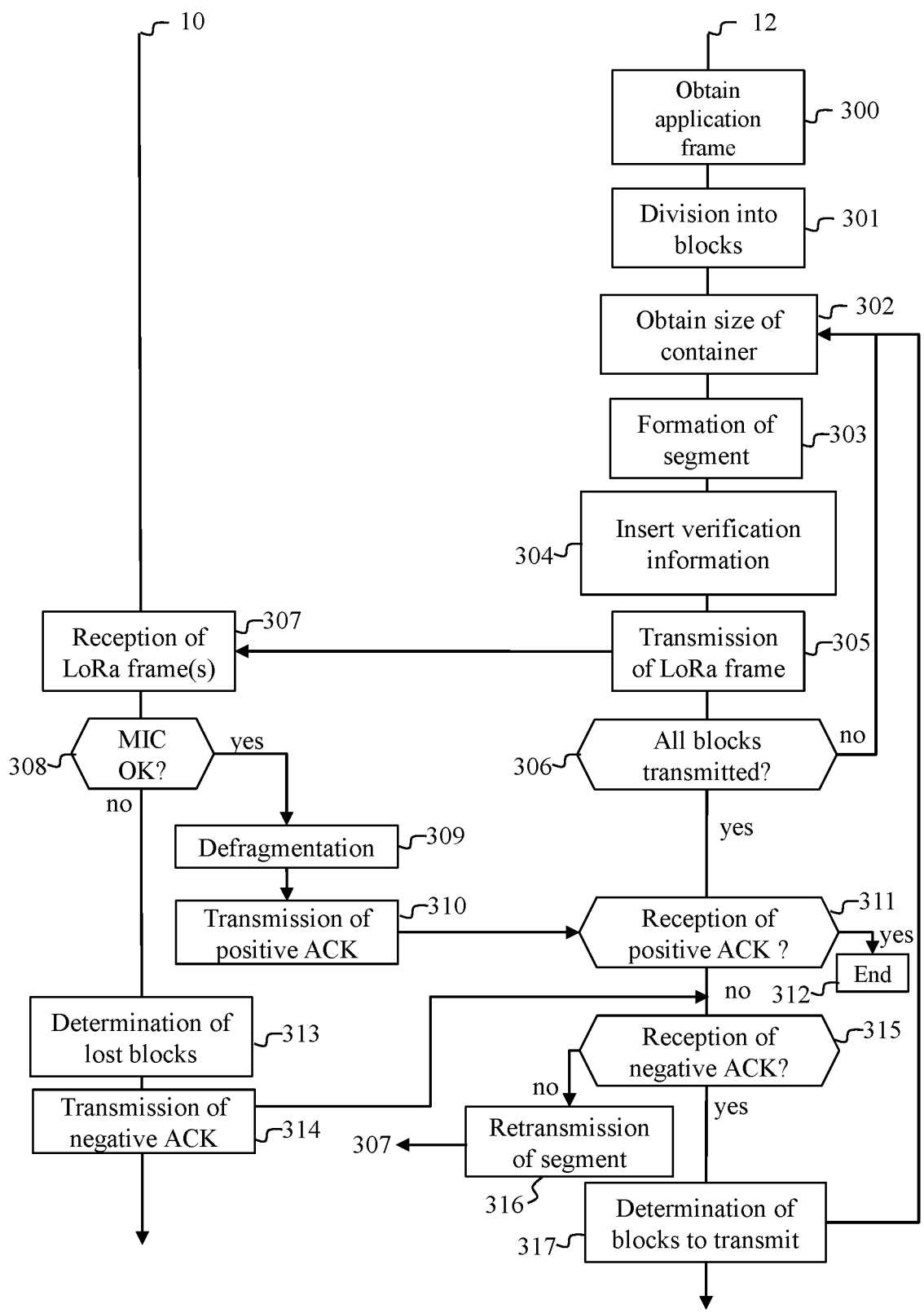
FIG. 3 illustrates schematically a first example of a communication method according to the invention.
Figure 8:
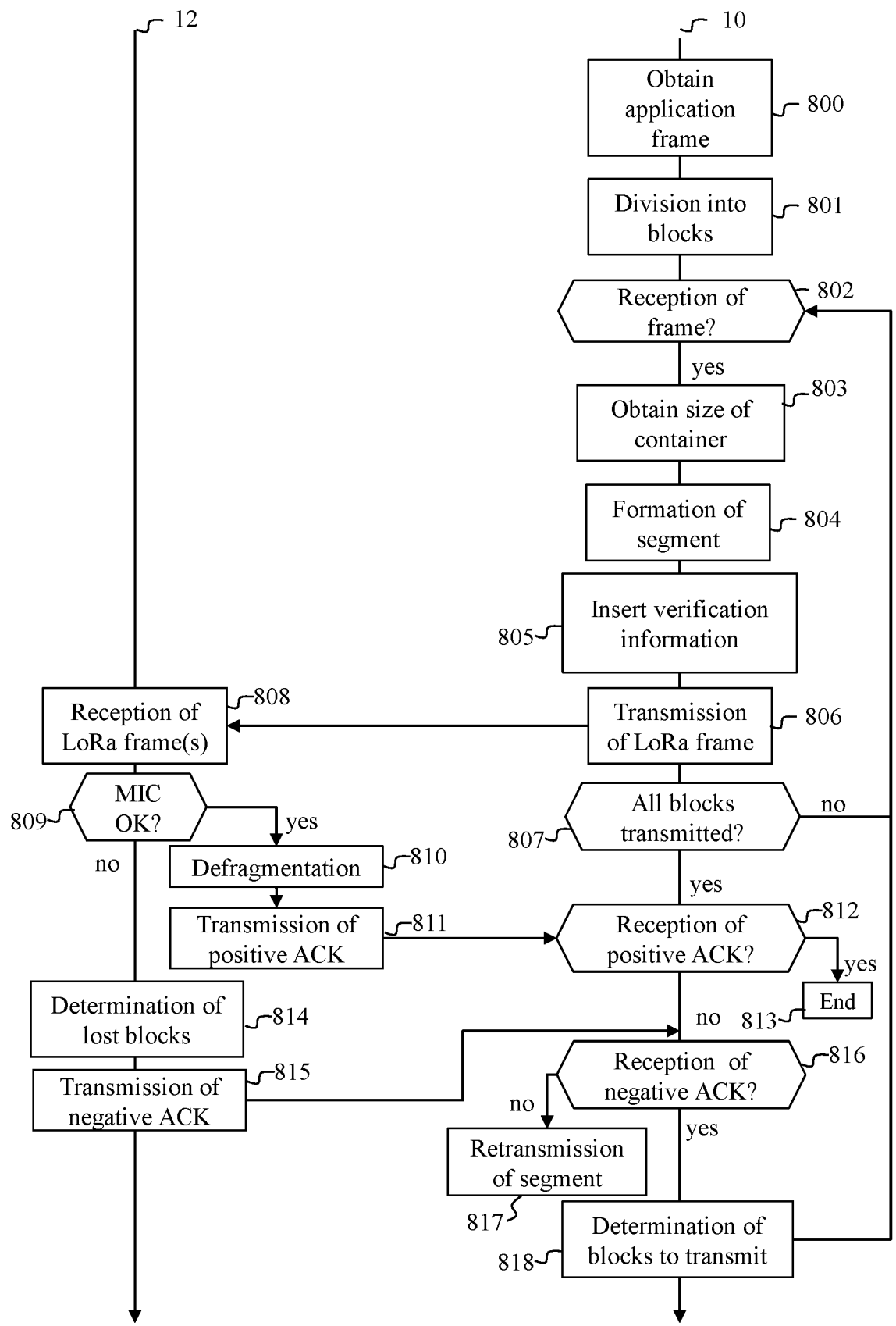
FIG. 8 illustrates schematically a second example of a communication method according to the invention.

The methods described in relation to FIGS. 3 and 8 may be implemented in software form by the execution of a set of instructions by a programmable machine, for example a DSP (digital signal processor) or a microcontroller, or be implemented in hardware form by a machine or a dedicated component, for example an FPGA (field-programmable gate array) or an ASIC (application-specific integrated circuit).

FIG. 3 illustrates schematically a first example of a communication method according to the invention.

In a step 300, the processing module 120 receives a payload frame to be transmitted to the LNS server 10. Hereinafter the payload frames are referred to as application frames.

In a step 301, the processing module 120 divides the application frame into a set of blocks of predefined size L. In one embodiment, the predefined size L is equal to a minimum size $B_{min}$ of a LoRa payload. The minimum size $B_{min}$ is dependent on the implementation of the LoRaWAN protocol used and is supposed to be known to the processing module 120. In one embodiment $B_{min}$=32 bytes. Each block in the set of blocks is associated with a number equal to a rank of said block in the application frame.

In steps 302 to 306, the processing module applies an encapsulation and transmission procedure to the blocks in said set of blocks.

During step 302, the processing module 120 obtains a current size $l_{curr}$ of a LoRa payload. As seen above, the size of a LoRa payload may vary from one LoRa frame to another LoRa frame. This size depends on the useful bitrate available for the communications between the endpoint 12 and the gateway 11 and the necessity or not of transmitting control data of the communications in accordance with the LoRaWAN protocol (i.e. also referred to as MAC (medium access control) commands. The processing module 120 knows at all times the current size $l_{curr}$ of a LoRa payload since it knows at all times what the useful bit rate is and whether control data must be transmitted.

During step 303, the processing module 120 runs through the blocks by decreasing numbers (that is to say by decreasing rank in the application frame) and inserts a segment in each block. A segment comprises a header and at least one block.

Figure 4:
FIG. 4 illustrates schematically a first header format of a segment intended to contain payload blocks.

FIG. 4 illustrates schematically a first header format of a segment intended to contain payload blocks.

The header of a segment described in relation to FIG. 4 is for example coded in 8 bits.

A first field 400, coded in 1 bit, referred to as the FS (fragmentation session) field comprises information representing a change of set a value of which is modified each time a new set of blocks is transmitted. For example, when a first set of blocks is transmitted by the processing module 120, the FS field is at 1. If the first set of blocks is transmitted successfully, the FS field passes to 0 for a second set of blocks transmitted by the processing module 120. If the second set of blocks is transmitted successfully, the FS field goes to 1 again for a third set of blocks transmitted by the processing module 120.

A second field 401, coded in 1 bit, referred to as the AR (acknowledge request) field, comprises information representing a request for acknowledgement of reception.

The AR field 401 enables the processing module 120 to activate or not an acknowledgement of reception mechanism. When the acknowledgement of reception mechanism is activated, the processing module 120 awaits an acknowledgement of reception from the LNS server 10 following the transmission of a set of blocks. For example, the acknowledgement of reception mechanism is activated when the AR field 401 is at 1. In one embodiment, only the segment comprising block 0 comprises an AR field 401 at 1 in order to activate the acknowledgement of reception mechanism for the whole set of blocks.

A third field 402, coded in 6 bits, comprises verification information. The verification information comprises an identifier representing the number of the block having the highest rank in said segment. As we shall see hereinafter, the verification information enables the LNS server 10 to check whether it has received all the blocks in the set of blocks transmitted and, if not, to determine which blocks have been lost.

In one embodiment, the segment header could be longer and in particular the field 402 in order to take into account sets of blocks comprising more than 64 blocks.

It should be noted that a segment is of a size (i.e. length) equal to a sum of the total sizes of each block included in said segment and of a size of the header of said segment.

Figure 5:
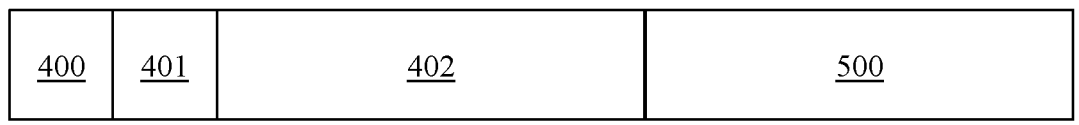
FIG. 5 illustrates schematically a second header format of a segment intended to contain payload blocks.

FIG. 5 illustrates schematically a second header format of a segment intended to contain payload blocks.

The header described in relation to FIG. 5 comprises fields 400 and 401 identical respectively to the fields 400 and 401 in FIG. 4. However, in this header, the verification information is distributed over two fields: the field 402, which is identical to the field 402 in FIG. 4, and a field 500. The field 500 comprises an error detection code, also referred to as an MIC (message integrity check). The error detection code is calculated on all the blocks in a set of blocks and makes it possible to determine whether one or more blocks have been lost during the transmission of said set.

The header in FIG. 5 is used solely in a segment containing the block having the smallest number (i.e. having the lowest rank), that is to say the number 0. The header in FIG. 4 is used in all the other segments.

Returning to FIG. 3, the processing module 120 runs through the blocks by decreasing numbers and inserts the blocks in this order in a segment until a segment size as close as possible to the current size $l_{curr}$ is reached. The processing module 120 therefore maximises the number of blocks inserted in each segment while obtaining one (or more) segments of a size less than or equal to the current size $l_{curr}$.

During step 304, the processing module 120 inserts the verification information in the segment thus formed.

In a step 305, the processing module 120 inserts the segment thus formed in a payload of a LoRa frame and transmits said LoRa frame in the direction of the LNS server 10.

In a step 306, the processing module 120 checks whether all the blocks in the set of blocks have been transmitted. If all the blocks have been transmitted and the reception acknowledgement mechanism is not activated, the processing module 120 ends the transmission of the set of blocks and for example awaits a new application frame.

If all the blocks have been transmitted and the reception acknowledgement mechanism is activated, the processing module 120 awaits an acknowledgement of reception for the set of blocks transmitted.

If blocks remain to be transmitted, the processing module 120 returns to step 302.

Figure 7:
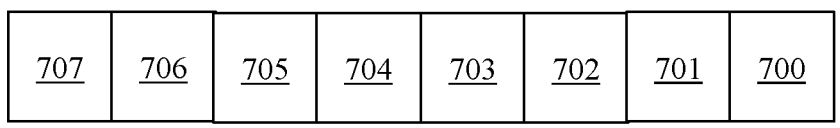
FIG. 7 illustrates schematically an example of formation of segments.
Figure 7:
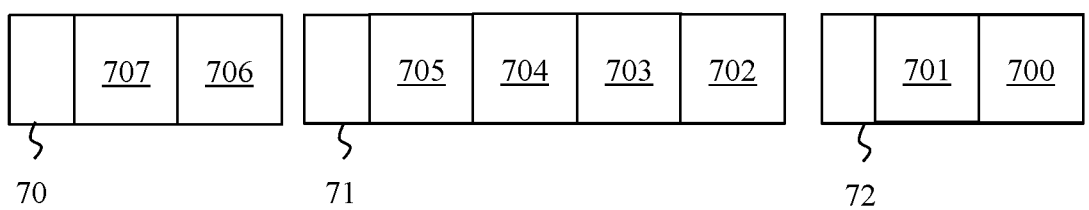

FIG. 7 illustrates schematically an example of formation of segments. In the example in FIG. 7, the processing module 120 has obtained an application frame and has divided it into a set of 8 blocks 700 to 707. The block 700 (and respectively 701, 702, 703, 704, 705, 706, 707) corresponds to the block number 0 (and respectively 1, 2, 3, 4, 5, 6, 7) in said set of blocks. The block number 0 is therefore the block with the lowest rank. When the encapsulation and transmission procedure is applied, the processing module 120 has run through the blocks from block number 7 to block number 0. A first segment 70 has been formed with blocks 7 and 6. In this segment 70, the verification information represents the number 7 in the field 402, the FS field 400 is for example at 0 and the AR field 401 is at 0. A second segment 71 has been formed with the blocks 5, 4, 3 and 2. In this segment 71, the verification information represents the number 5 in the field 402, the FS field 400 is at 0 and the AR field 401 is at 0. It should be noted that, since the size of the LoRa payload has increased between the formation of the segment 70 and the formation of the segment 71, the processing module 120 has been able to insert more blocks in the segment 71 than in the segment 70. A third segment 72 has been formed with blocks 1 and 0. In this segment 72, the verification information represents the number 1 in the field 402 and comprises a field 500 containing an error detection code calculated on blocks 0 to 7. The FS field 400 is at 0 and the AR field 401 is at 1 since the acknowledgement of reception mechanism is activated. It should be noted that, since the size of the LoRa payload has decreased between the formation of the segment 71 and the formation of the segment 72, the processing module 120 has inserted fewer blocks in the segment 72 than in the segment 71.

Returning to FIG. 3, during a step 307, the processing module 100 of the LNS server 10 receives a certain number of LoRa frames and awaits reception of a LoRa frame comprising a segment containing a field 500 (and therefore an error detection code) and a block number 0.

As soon as it receives a segment containing a field 500, the processing module 100 executes a step 308.

During step 308, the processing module 100 checks whether it has received all the blocks in the set of blocks transmitted using the error detection code. If no error is detected, the processing module 100, in a step 309, re-forms the application frame. The processing module 100 supplies for example this application frame to an application module that it executes.

If the acknowledgement of reception mechanism is activated, the processing module 100 executes a step 310, during which the processing module 100 retransmits a positive acknowledgement of reception to the endpoint 12.

In a step 311, the processing module 120 receives the positive acknowledgement of reception and ends the transmission of the current set of blocks during a step 312. The processing module 120 then for example awaits a new application frame.

If during step 308 the processing module 100 detects that it has not received all the blocks using the error detection code, it determines, from the AR field of the segment comprising block 0, whether the acknowledgement of reception mechanism is activated. If this mechanism is not activated, the processing module 100, for example, rejects the received blocks considering that, if the set of blocks is not complete, it can re-form a usable application frame. In one embodiment, the processing module 100 can transmit an incomplete set of blocks to an application module, which it executes.

If during step 308 the processing module 100 detects that it has not received all the blocks and the acknowledgement of reception mechanism is activated, it executes a step 313.

During step 313, the processing module 100 determines which block or blocks have been lost. To do this, it uses the block number contained in the field 402 of each segment. For example, if the segment 71 is lost, the processing module 100 knows that the segment 70 contains the block 7 by reading the field 402 and that the segment 70 contained two consecutive blocks. It therefore deduces from this that the segment 70 also contained block 6. In addition, the processing module 100 knows that the segment 72 contained block 1 by reading the field 402 and that the segment 72 contains two consecutive blocks. It therefore deduces from this that the segment 72 also contained block 0. The processing module 100 also deduces that block 0 is situated in the segment 72 from the presence of the field 500 in the segment 72. The processing module 100 therefore deduces that blocks 5, 4, 3 and 2 are missing.

In a step 314, the processing module 100 transmits a negative acknowledgement of reception containing information representing each block not received.

Figure 6:
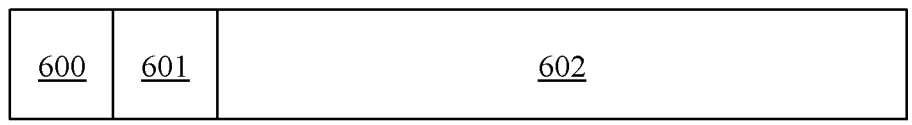
FIG. 6 illustrates schematically a reception acknowledgement format.

FIG. 6 illustrates schematically an acknowledgement of reception format.

The acknowledgement of reception described in relation to FIG. 6 comprises a field 600, referred to as an FSB (fragment session backward) field coded in one bit, which is a copy of the FS field 400 of the set of blocks in the course of transmission. By using this field, the processing module 120 knows to which set of blocks the acknowledgement of reception relates. The acknowledgement of reception also comprises a field 601, referred to as a C (checked) field coded in one bit indicating whether the verification of the error detection code of the field 500 by the processing module 100 was positive or negative. If the C field is at 1, then the verification of the error detection code was positive (i.e. no block was lost). If the C field is at 0, then the verification of the error detection code was negative. The C field 601 is followed by a bitmap field (binary series) 602 comprising a variable number of bits, the fields 600, 601 and 602 having a total length that is a multiple of one byte. The field 602 comprises a number of least significant bits no more than the number of blocks in the set of blocks in the course of transmission. Each least significant bit represents a block, the rank of each least significant bit corresponding to a block number in the set of blocks. For example, block number 0 is associated with the first least significant bit (i.e. the bit furthest to the right). The most significant bits, which are not associated with a block, are used solely so that the total length of the fields 600, 601 and 602 is aligned on a multiple of one byte. The most significant bits are all at 0. When a block has been received by the processing module 100, the processing module 100 sets the bit corresponding to this block to 1. When a block has not been received by the processing module 100, the processing module 100 sets the bit corresponding to this block to 0.

A positive acknowledgement of reception therefore comprises a C field 601 at 1 and a bitmap field 602 comprising non-significant bits, for example 6 bits at 1.

A negative acknowledgement of reception therefore comprises a C field 601 at 0, and a bitmap field 602 in which all the bits corresponding to a received block are at 1, and all the bits corresponding to a lost block are at 0.

Returning to FIG. 3, during a step 315 the processing module 120 receives a negative acknowledgement of reception. For example, if the segment 71 has been lost, the processing module 120 receives an acknowledgement of reception comprising an FSB field 600 for example at 0, a C field 601 at 1 and a bitmap field 602 the least significant bits of which are equal to 11000011, the bit furthest to the right corresponding to block number 0 and the bit furthest to the left corresponding to block number 7.

Following reception of the negative acknowledgement of reception, the processing module determines which blocks have been lost using the bitmap field 602 in a step 317, and then returns to step 302 in order to retransmit at least the lost blocks. During this further execution of the encapsulation and transmission procedure, the processing module 120 takes into account the current size of the LoRa frame payloads. Thus, whereas blocks 5 to 2 had all been inserted in the same segment during the first transmission of these blocks, in this retransmission they could be transmitted in different segments if the current size of the payloads has decreased.

In one embodiment, at each retransmission of blocks, the processing module 120 retransmits solely the lost blocks.

In one embodiment, during each retransmission of blocks, the processing module 120 retransmits consecutive blocks. Thus, if non-consecutive blocks have been lost, the processing module 120 retransmits the lost blocks and also the blocks included between the two lost blocks, even if these blocks have been received.

In step 307, the processing module 100 combines the blocks received following a retransmission with the blocks received during the initial transmission, keeping only one version of each block if it received blocks several times.

During step 313, the processing module 100 determines the blocks that it had received (and therefore those that have been lost) according to the number of blocks contained in the field 402 of each segment, and numbers of blocks that it received previously.

During step 315, if after a predefined time D the processing module 120 has received neither a negative acknowledgement of reception nor a positive acknowledgement of reception, it deduces from this that the segment containing block 0 and the field 500 has been lost. In this case, it forms a segment comprising at least block 0 and the field 500 and retransmits this segment in a LoRa frame to the LNS server 10 during a step 316. On reception of this segment, the processing module 100 returns to step 307. The time D is for example equal to five minutes.

In one embodiment, the processing module 120 transmits the same block a maximum of N times. If at the end of a number N of transmissions, the processing module 120 still receives a negative acknowledgement of reception for the same set of blocks, it abandons the transmission of said set of blocks. The number N is for example equal to 8. In another embodiment, if at the end of a number N of transmissions the processing module 120 still receives a negative acknowledgement of reception for the same set of blocks, the processing module 120 retransmits all the blocks in the set of blocks. In this case, the processing module 120 changes the value of the field FS 400 in order to behave as if it transmitted a new set of blocks.

If following a reception of segments containing blocks in a first set of blocks, the processing module 100 does not receive a segment containing block 0 and the field 500 relating to this set of blocks but blocks of another session, the processing module 100 rejects the blocks for which it has not received a frame containing block 0 and the field 500. It then considers that the corresponding set is definitively lost.

In the description of the method in FIG. 3 below, the LoRa endpoint 12 fulfils a role of sender and the LNS server 10 fulfils a role of receiver. In a class B or C operating mode of the LoRaWAN protocol, the roles may be reversed. The LNS server 10 may thus become a sender and the LoRa endpoint 12 may become a receiver. Despite this change of role, the method of FIG. 3 remains identical.

In the case of the class A operating mode, the method of FIG. 3 may be applied when the LoRa endpoint 12 fulfils the role of sender and the LNS server 10 fulfils the role of receiver. However, another method described in relation to FIG. 8 is applied when the roles are reversed since in class A all the communications are at the initiative of the LoRa endpoint. In class A, the LNS server 10 cannot transmit a message to the LoRa terminal 12 when he so wishes.

FIG. 8 illustrates schematically a second example of a communication method according to the invention.

In a step 800, the processing module 100 receives an application frame to be transmitted to the LoRa endpoint 12.

In a step 801, the processing module 100 divides the application frame into a set of blocks of predefined size L. Each block in the set of blocks is associated with a number equal to a rank of said block in the application frame.

In a step 802, the processing module 100 awaits reception of a LoRa frame from the LoRa endpoint 12. This is because in class A each communication from the LNS server 10 to the LoRa endpoint 12 must be done at the initiative of the LoRa endpoint 12. As soon as a LoRa frame is received from the LoRa endpoint 12, the processing module 100 executes a step 803.

During step 803, the processing module 100 obtains the current size $l_{curr}$ of a LoRa payload.

In a step 804, the processing module 100 runs through the blocks by decreasing numbers and inserts the blocks in this order in a segment until it reaches a segment size as close as possible to the current size $l_{curr}$. The processing module 100 therefore maximises the number of blocks inserted in each segment while obtaining one (or more) segments of size less than or equal to the current size $l_{curr}$. As in the method described in relation to FIG. 3, the segment comprising block 0 comprises the header described in relation to FIG. 5 whereas all the other segments comprise the header described in relation to FIG. 4.

In a step 805, the processing module 100 inserts the verification information in the segment thus formed.

In a step 806, the processing module 100 inserts the segment thus formed in a LoRa payload and transmits the corresponding LoRa frame in the direction of the LoRa endpoint 12. The transmission is done in the reception windows of the LoRa endpoint 12 defined as from an instant of reception of the LoRa frame received during step 802.

In a step 807, the processing module 100 checks whether all the blocks in the set of blocks have been transmitted.

If some blocks have not been transmitted, the processing module 100 returns to step 802 and awaits reception of a LoRa frame coming from the LoRa endpoint 12 in order to continue.

If all the blocks have been transmitted and the acknowledgement of reception mechanism is not activated, the processing module 100 ends the transmission of the set of blocks and for example awaits a new application frame.

If all the blocks have been transmitted and the acknowledgement of reception mechanism is activated, the processing module 100 awaits an acknowledgement of reception from the LoRa endpoint 12.

In a step 808, the processing module 120 of the LoRa endpoint 12 receives a certain number of LoRa frames and awaits reception of a LoRa frame comprising a segment containing a field 500 (and therefore an error detection code) and a block numbered 0.

As soon as it receives a segment containing a field 500, the processing module 120 executes a step 809.

During step 809, the processing module 120 checks whether it has received all the blocks in the set of blocks transmitted using the error detection code. If no error is detected, the processing module 120, during a step 810, re-forms the application frame. The processing module 120 supplies, for example, this application frame to an application module that it executes.

If the acknowledgement of reception mechanism is activated, the processing module 120 executes a step 811 during which the processing module 120 transmits a positive acknowledgement of reception to the LNS server 10.

In a step 812, the processing module 100 receives the positive acknowledgement of reception and ends the transmission of the current set of blocks in a step 813. The processing module 100 then, for example, awaits a new application frame.

If during step 809 the processing module 120 detects that it has not received all the blocks, it determines, from the AR field whether the acknowledgement of reception mechanism is activated. If this mechanism is not activated, the processing module 120 for example rejects the blocks received considering that, if the set of blocks is not complete, it cannot re-form a usable application frame.

If during step 809 the processing module 120 detects that it has not received all the blocks and the acknowledgement of reception mechanism is activated, it executes a step 814.

During step 814, the processing module 120 determines which block or blocks have been lost.

In a step 815, the processing module 120 transmits a negative acknowledgement of reception containing information representing each block not received.

During a step 816, the processing module 120 receives a negative acknowledgement of reception.

Following the reception of the negative acknowledgement of reception, the processing module determines which blocks have been lost using the bitmap field 602 in a step 818 and then returns to step 802 in order to retransmit at least the blocks lost. There also, the processing module 100 awaits reception of a LoRa frame coming from the LoRa endpoint 12 in order to continue the encapsulation and transmission procedure.

In step 808, the processing module 120 combines the blocks received following a retransmission with the blocks received during the initial transmission, keeping only one version of each block if it receives blocks several times.

In step 814, the processing module 120 determines the blocks that it has received (and therefore those that have been lost) according to the number of blocks contained in the field 402 of each segment, and the numbers of blocks that it received previously.

In step 816, if after a predefined time D the processing module 100 has received neither negative acknowledgement of reception nor positive acknowledgement of reception, it deduces from this that the segment containing block 0 and the field 500 has been lost. In this case, it forms a segment comprising at least block 0 and the field 500 and transmits this segment in a LoRa frame to the endpoint 12 in a step 817. There also the processing module 100 waits to receive a LoRa frame coming from the LoRa endpoint 12 in order to execute step 817. When this segment is received, the processing module 120 returns to step 808. The time D is for example equal to five minutes.

In one embodiment, the processing module 120 transmits the same block a maximum of N times. If at the end of a number N of transmissions of the same block, the processing module 100 still receives a negative acknowledgement of reception for the same set of blocks, it abandons the transmission of said set of blocks. The number N is for example equal to 8. In another embodiment, if at the end of a number N of transmissions the processing module 100 still receives a negative acknowledgement of reception for the same set of blocks, the processing module 100 retransmits all the blocks in the set of blocks. In this case, the processing module 100 changes the value of the FS field 400 in order to behave as if it transmitted a new set of blocks.

If following reception of segments containing blocks in a first set of blocks, the processing module 100 does not receive a segment containing block 0 and the field 500 relating to this set of blocks but blocks of another set of blocks, the processing module 100 rejects the blocks for which it has not received a segment containing block 0 and the field 500. It then considers that the corresponding set of blocks is definitively lost.

As seen above, steps of the method of FIG. 8 executed by the processing module 100 are dependent on a reception by the LNS server 10 of a LoRa frame coming from the LoRa endpoint 12. The transmissions of LoRa frames by the LoRa endpoint 12 to the LNS server 10 may be very spaced apart in time. In order to avoid a transmission of a set of blocks by the LNS server 10 taking too much time, as soon as the processing module 120 knows that a transmission of a set of blocks is under way the processing module 120 measures, at each reception of a segment, a time 6 from the reception of said segment. When the time 6 exceeds a predefined maximum time A, the processing module 120 transmits a frame, referred to as a TR (transmission request) frame, representing a request for transmission of data to the LNS server 10 in order to enable the LNS server 10 to transmit a new segment. The processing module 12 knows that a transmission of a set of blocks is under way when it receives a segment where the value of the FS field 400 has been modified compared with the segment that it previously received. In one embodiment, the predefined maximum time A is equal to five minutes.

In one embodiment, the processing module 120 reiterates the sending of a TR frame a number K of times as long as it does not once again receive a segment for the set of blocks in the course of transmission. For example, the number K=8. In one embodiment, the processing module 120 discards the blocks corresponding to the set of blocks in the course of transmission if after K transmissions of a TR frame the processing module 120 has not received a new segment.

In an embodiment applicable in the case of the method described in FIG. 3 or in the context of the method described in FIG. 8, the processing module of the sending node may end a transmission of a set of blocks. The transmitting node may be the LoRa endpoint 12 or the LNS server 10. To do this, the processing module of the sending node transmits a frame as described in FIG. 4 in which the FS field 400 is at the value of the set of blocks in the course of transmission, the AR field 401 is at 0 and the field 402 is at 000000. When it receives this frame, the processing module of the receiving node knows that the sender has ended the transmission of the set of blocks corresponding to the value of the FS field 400. The processing module of the sending node can then pass to a following set of blocks. In one embodiment, the processing module of the receiving node discards the blocks corresponding to the set of blocks the transmission of which was interrupted. In one embodiment, the processing module of the receiving node transmits the blocks corresponding to the set of blocks the transmission of which was interrupted to an application module that it executes.

The invention claimed is:

1. A method for communication between first and second nodes in a network using a frame transmission protocol, each frame in accordance with said protocol, referred to as a protocol frame, comprising a payload intended to transport useful data, each payload having a size that may vary from one protocol frame to another protocol frame, wherein the method comprises steps executed by the first node comprising:

obtaining a payload frame to be transmitted to the second node;

dividing the payload frame into a set of blocks of predefined size, each block being associated with a number equal to a rank of said block in the payload frame;

applying an encapsulation and transmission procedure to the blocks of said set comprising:

running through the blocks in decreasing order of their number, and inserting the blocks in this order in at least one segment, the blocks being inserted in each segment until a segment size that is as close as possible to a current size of a payload is reached while remaining smaller than or equal to it;

inserting verification information in each segment, said verification information comprising, in each segment comprising more than one block in which it is inserted, an identifier representing the number of the block that has the highest rank in said segment, and in addition comprising, when it is inserted in the segment containing the block with the lowest rank, an error identification code making it possible to determine whether the set of blocks has been received; and transmitting each segment to the second node in a protocol frame;

and, in the case of reception of an acknowledgement of reception from the second node containing information representing at least one block not received by the second node, applying the encapsulation and transmission procedure to at least each block that was not received, the second node having used each item of verification information received in order to determine each block lost.

2. The method according to claim 1, wherein the network is a long-range wireless network affording low energy consumption based on LoRa technology, the protocol is the LoRaWAN protocol and the first node is a device suitable for communicating on a LoRa network using the LoRaWAN protocol, referred to as a LoRa endpoint, and the second node is a LoRa network server, or the first node is a LoRa network server and the second node is a LoRa endpoint.

3. The method according to claim 2, wherein the first node is a server and the second node is a LoRa endpoint functioning in class A according to the LoRaWAN protocol, when the second node has received a first segment comprising blocks in a set of blocks, at each reception of a segment the second node measures a time since the reception of said segment and, when said time is greater than a predefined maximum time without a frame having been transmitted to the first node, transmits a protocol frame representing a request for transmission of data to the first node in order to enable the first node of transmit a new segment.

4. The method according to claim 1, wherein if, following the transmission of each segment to the second node, the first node does not receive an acknowledgement of reception from the second node after a predefined time following the transmission of the last segment, the first node transmits to the second node a segment containing at least the block with the lowest rank, the error identification code and an identifier representing the number of the block that has the highest rank in said segment.

5. The method according to claim 1, wherein the verification information is included in a header of said segment, said header further comprising information representing a change of set of blocks a value of which is modified each time a new set of blocks is transmitted to the second node and/or information representing a request for acknowledgement of reception, making it possible to activate or not a reception acknowledgement mechanism, the first node awaiting an acknowledgement of reception for the set of blocks from the second node when said mechanism is activated.

6. The method according to claim 1, wherein the information representing at least one block not received by the second node is a series of bits, each bit in the series representing a block in the set of blocks, and, for each bit, a first value of said bit indicates a reception of the corresponding block and a second value of said bit indicates non-reception of the corresponding block.

7. The method according to claim 1, wherein the acknowledgement of reception comprises information for identifying to which set of blocks said acknowledgement of reception relates and/or information indicating if, when there is a verification of integrity of the blocks received using the error detection code, the second node has or has not detected an error.

8. A non-transitory storage medium, wherein said storage medium stores a computer program comprising instructions for the implementation, by a device, of the method according to any of claim 1, when said program is executed by a processor of said device.

9. A device, referred to as the first node, of the communication node type suitable for communicating with a second device of the communication node type, referred to as the second node, in a network using a frame transmission protocol, each frame in accordance with said protocol, referred to as a protocol frame, comprising a payload intended to transport useful data, each payload having a size that may vary from one protocol frame to another protocol frame, wherein the device comprises electronic circuitry configured for:

obtaining a payload frame to be transmitted to the second node;

dividing the payload frame into a set of blocks of predefined size, each block being associated with a number equal to a rank of said block in the payload frame;

applying an encapsulation and transmission procedure to the blocks in said set comprising:

running through the blocks in decreasing order of their number, and inserting the blocks in this order in at least one segment, the blocks being inserted in each segment until a segment size as close as possible to a current size of a payload is reached while remaining smaller than or equal to it;

inserting verification information in each segment, said verification information comprising, in each segment comprising more than one block in which it is inserted, an identifier representing the number of the block that has the highest rank in said segment, and also comprising, when it is inserted in the segment containing the block with the lowest rank, an error identification code for determining whether the set of blocks has been received;

transmitting each segment to the second node in a protocol frame;

and receiving from the second node an acknowledgement of reception comprising information representing at least one block not received by the second node, applying an encapsulation and transmission procedure to at least each block not received in the case of reception of such an acknowledgement of reception from said second node, the second node having used each item of verification information received in order to determine each block lost.

* * * * *